Figure 1:
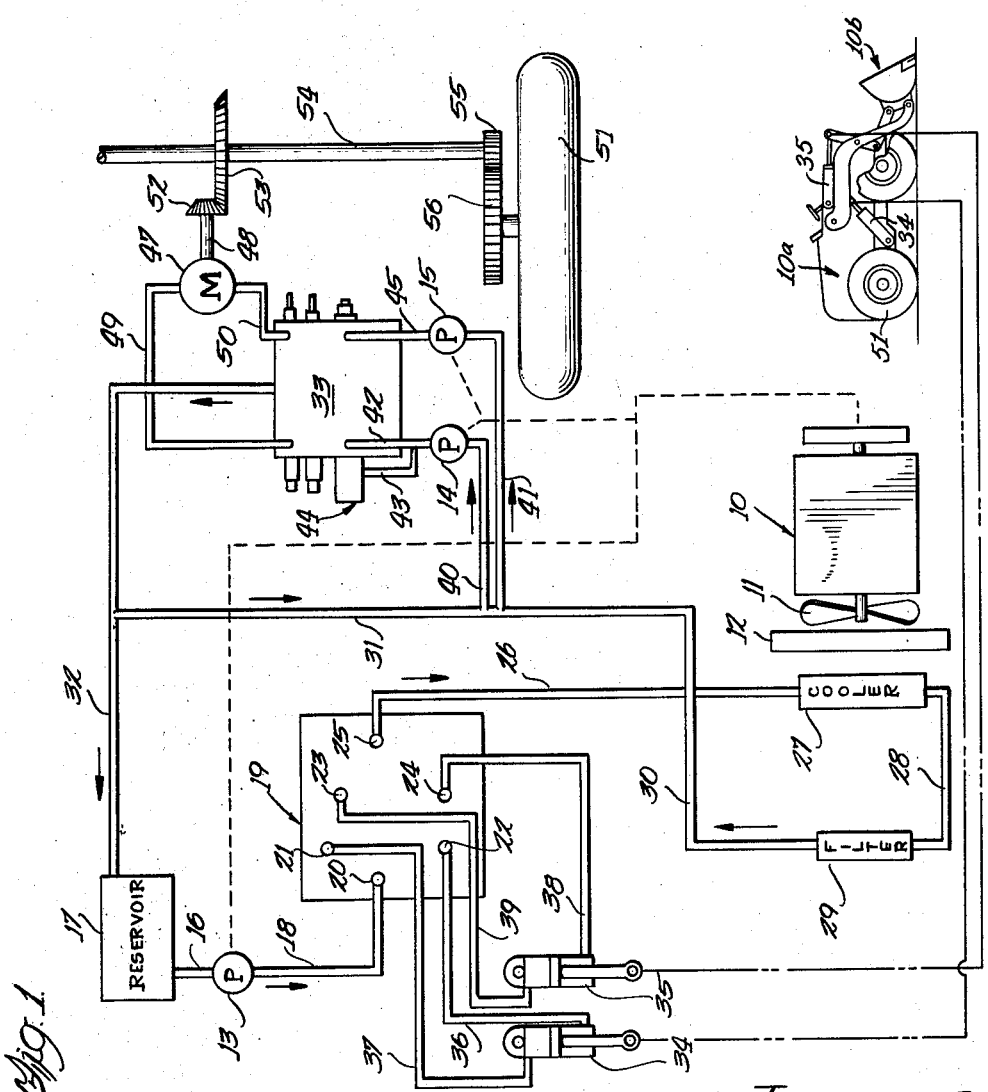

Sept. 15, 1964 T. G. GRANRYD 3,148,502
HYDROSTATIC TRANSMISSION ARRANGEMENT FOR TRACTOR LOADERS
Filed June 28, 1961 2 Sheets-Sheet 1

INVENTOR
THORVALD G. GRANRYD
Paul O. Pinard
ATTORNEY

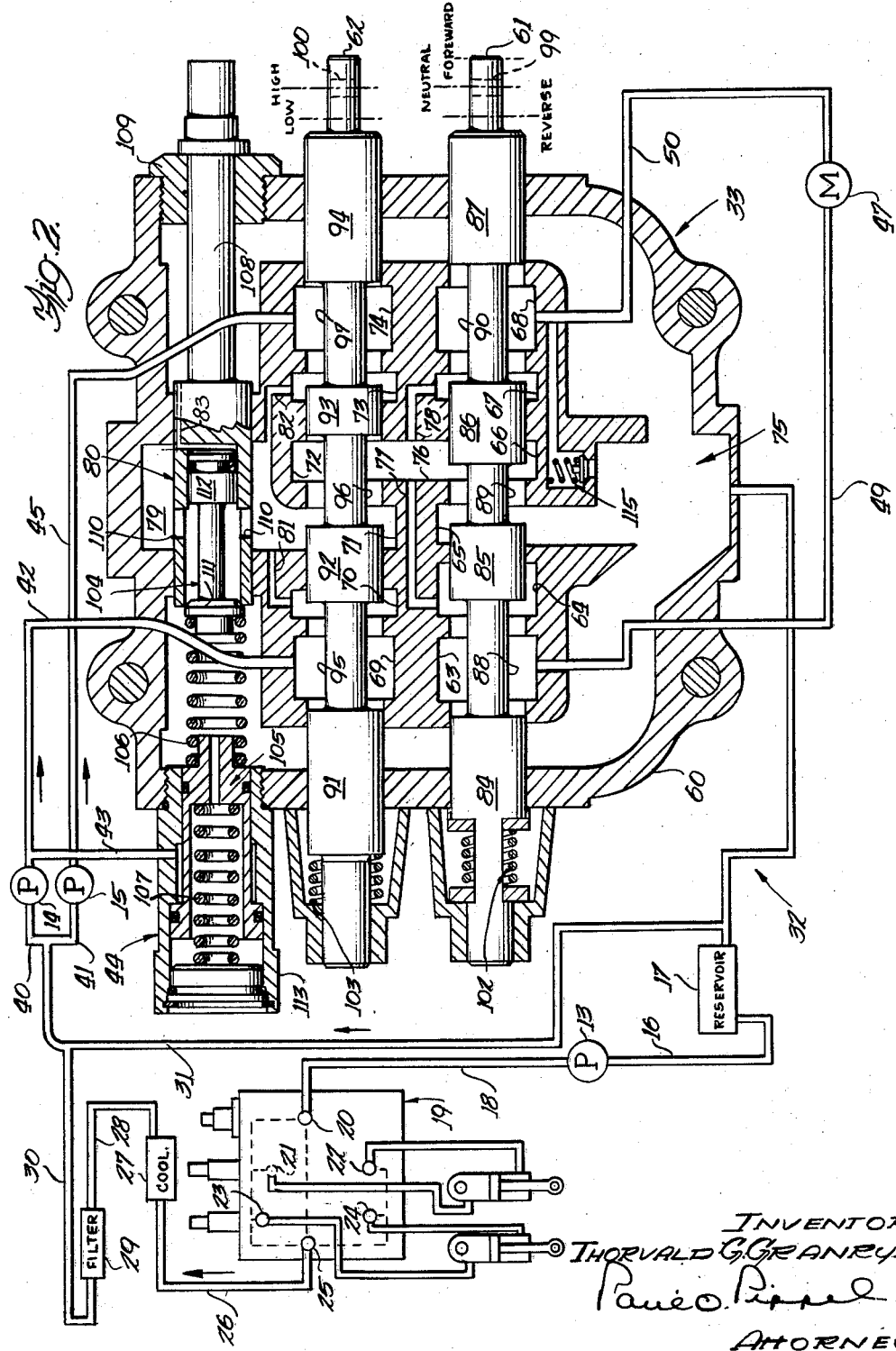

United States Patent Office 3,148,502
Patented Sept. 15, 1964

3,148,502
HYDROSTATIC TRANSMISSION ARRANGEMENT
FOR TRACTOR LOADERS
Thorvald G. Granryd, Libertyville, Ill., assignor to The
Frank G. Hough Co., a corporation of Illinois
Filed June 28, 1961, Ser. No. 120,412
16 Claims. (Cl. 60—19)

This invention relates generally to tractor loaders and more specifically to a hydrostatic transmission arrangement in combination with the loader hydraulic system of a tractor loader.

It is the object of the present invention to provide for a maximum utilization of the available horsepower of the engine in a front end type tractor loader wherein the wheels are driven by a hydrostatic arrangement and wherein the tool means of the tractor loader are hydraulically operated.

A further object of the present invention is to provide a dual pump arrangement for a hydrostatic drive arrangement of a tractor loader in combination with the tool hydraulic system and with certain novel valve means providing for the utilization of substatnially the full available engine power for propulsion of the tractor when the tractor is in the travel speed range, and reduced but sufficient propulsion power with high tractive effort when the tractor is operated in the low speed range and the loader thereof is simultaneously being operated at its maximum capacity.

Other objects and features of the invention will be apparent upon a perusal of the following specification and drawings, of which:

FIGURE 1 is a diagrammatic view of a portion of a tractor loader constructed according to the present invention; and FIGURE 2 is a diagrammatic view of the invention including an enlarged cross sectional view of the hydrostatic transmission control valve.

The present embodiment is the preferred embodiment, but it is to be understood that changes can be made in the present embodiment by one skilled in the art without departing from the spirit and scope of the present invention.

Generally, the invention comprises a large pump and a substantially smaller pump connected to be continuously driven by the engine of a front end type tractor loader. The output of both of the pumps is delivered to a transmission control valve, and the transmission control valve in turn is connected to a hydrostatic motor for driving the tractor. The motor may be connected by any suitable means known in the art to the wheels of the tractor. A third pump is provided for operating the loader portion of the tractor loader and that pump is also continuously driven by the engine of the tractor. The loader hydraulic system includes a hydraulic pump, hydraulic valve and hydraulic rams or motors for operating the tool of the loader, and a cooler and filter which will continuously cool and filter a substantially constant portion of the hydraulic fluid. The hydrostatic transmission system and the hydraulic system of the loader use a common reservoir.

The control valve for the hydrostatic transmission arrangement has two spools, one of which provides for forward and reverse operation of the tractor and includes a neutral position. The second spool has two positions, a high range position wherein the output of both of the transmission pumps is delivered to the hydrostatic motor, and a low range position wherein the larger pump of the two hydrostatic pumps is vented and the smaller pump is connected to drive the hydrostatic motor.

The transmission control valve further includes a relief valve which provides a certain relatively low relief pressure when the tractor is traveling in the high speed range from both transmission pumps to prevent engine stalling in the traveling speed range. The relief valve further provides a relatively high relief pressure when the tractor is operating in the low speed range. This relatively high relief pressure provides for the development of maximum obtainable tractive effort while digging or loading in the low speed range. When the tractor is operating in the low speed range and the loader pump is operating to develop the maximum pressure permitted by a second pressure relief valve in the loader control valve, the power developed by the small transmission pump, as determined by its flow and maximum pressure, plus the power developed by the loader pump, as determined by its flow and maximum pressure, substantially equals the maximum available power of the engine. Thus a novel balanced power system is provided for a front end type tractor loader.

For a detailed description of the present invention, reference is made to the drawing. Although only portions of a tractor loader to which it is intended that the invention be applied are shown, the remaining necessary structure to provide a working tractor loader may be easily understood from the tractor loader shown in my prior Patent No. 2,842,273, issued July 8, 1958. The tractor engine 10 is carried on the frame of the tractor and includes a conventional fan 11 and radiator 12. Any suitable means known in the art are used to drive the pumps 13, 14 and 15 from the engine 10. The driving connections are shown by the dotted lines in FIGURE 1. The hydraulic pump 13 is the hydraulic pump for the loader portion of the tractor loader. The hydraulic pumps 14 and 15 are the hydrostatic transmission pumps of the subject invention. The transmission pump 14 is a relatively large pump, substantially larger than the transmission pump 15. In one reduction to practice of the present invention, a pump 14 which had a displacement of approximately five times the displacement of the small pump 15 was found to provide a satisfactory working arrangement.

The suction side of the loader pump 13 is connected by a hydraulic fluid conduit 16 to the hydraulic fluid reservoir 17. The pressure side of the pump 13 is connected by a hydraulic fluid conduit 18 to the loader control valve 19. The loader control valve 19 is of the open center type and may be of any suitable construction known in the art. The loader control valve is provided with ports 20, 21, 22, 23, 24 and 25, with port 20 being connected to conduit 18. For the present description it is sufficient to note that the loader control valve 19 includes valve spools positionable in a neutral position and various operated positions on each side of the neutral position. When the valve spools are in the neutral position, any hydraulic fluid entering port 20 is directed through the valve 19 to port 25. When either of the spools are operated to one of the operated positions on either side of the neutral position any hydraulic fluid entering port 20 is directed to one or more of the ports 21, 22, 23 and 24, while the remaining ports not connected to port 20 are connected to port 25. Port 25 is connected to one end of conduit 26, the other end of which is connected to the input side of the cooler 27. The hydraulic fluid cooler 27 may be of any suitable type known in the art and is physicall mounted in cooperation with the fan 11 of the engine 10 for cooling the hydraulic fluid passing therethrough. The output side of the cooler 27 is connected by conduit 28 to the input side of a hydraulic fluid filter 29. The hydraulic fluid filter 29 may also be of any suitable type known in the art. The output side of the filter 29 is connected to one end of a hydraulic fluid conduit 30. The other end of conduit 30 is connected to one end of conduit 31, and the other end of conduit 31 is connected into the hydraulic fluid conduit 32. One end of conduit 32 is connected into the reservoir 17, and the other end of conduit 32 is connected to a port of the transmission control valve 33.

The hydraulic rams or motors 34 and 35 are provided for operating the loader mechanism in a manner such as shown in my aforementioned patent. The rod end of hydraulic ram 34 is connected by hydraulic fluid conduit 36 to port 22 of the loader control valve 19. The head end of hydraulic ram 34 is connected by hydraulic fluid conduit 37 to port 21 of valve 19. The rod end of hydraulic ram 35 is connected by conduit 38 to port 24 of valve 19, and the head end of ram 35 is connected by conduit 39 to port 23 of valve 19. In FIGURE 1, the loader rams 34 and 35 are shown positioned on the tractor loader 10a for operation of the shovel loader 10b. Although only two rams 34 and 35 are shown, it is to be understood that there are two corresponding rams for the other side of the shovel loader.

The suction side of the large transmission pump 14 is connected by conduit 40 to conduit 31, and the suction side of the small transmission pump 15 is connected by conduit 41 to conduit 31. The pressure side of transmission pump 14 is connected by hydraulic fluid conduit 42 to the transmission control valve 33. A hydraulic fluid conduit 43 is connected between conduit 42 and the projecting end portion of the relief valve 44 of the transmission control valve 33. The pressure side of the transmission pump 15 is connected by conduit 45 into the control valve 33.

The hydrostatic motor 47 for operating the traction members of the tractor may be of any suitable type known in the art and will rotate its output shaft 48 in either direction dependent upon the direction of flow of hydraulic fluid through the motor 47. One side of the motor 47 is connected by conduit 49 to the transmission control valve 33 and the other side of the motor 47 is connected by conduit 50 to the transmission control valve 33. The output shaft 48 of the motor 47 is connected by any suitable means to drive the traction members of the tractor. In the present embodiment, one wheel 51 of the tractor is shown, and the output shaft 48 drives a bevel gear 52, in turn driving another bevel gear 53 which may form part of a differential gearing arrangement. The bevel gear 53 in turn drives the shaft 54 which in turn drives a gear 55, which in turn meshes with gear 56. Gear 56 is connected to drive the wheel 51.

The transmission control valve 33 which is shown in an enlarged cross-sectional view in FIGURE 2, comprises a housing 60 with two valve spools 61 and 62 slidably carried therethrough. Each of the spools 61 and 62 is carried in a valve bore formed through the body of the valve. Each valve bore is provided with various annular grooves cooperating with annular grooves and lands on the valve spools 61 and 62 for selective direction of hydraulic fluid between conduits 42, 45, 49 and 50.

The valve bore for the spool 61 is provided with annular grooves 63, 64, 65, 66, 67 and 68. Conduit 49 from the motor 47 is connected directly into annular groove 63, and conduit 50 from the motor 47 is connected directly into annular groove 68.

The valve bore for the spool 62 is provided with annular grooves 69, 70, 71, 72, 73 and 74. Annular groove 69 is directly connected through the valve body to conduit 42, and annular groove 74 is directly connected to conduit 45.

The valve body is further provided with a number of passageways therein. One of these passageways is connected to conduit 32, annular groove 65, and intersects each end of each valve bore for the valve spools 61 and 62 adjacent to the annular grooves 63, 69, 68 and 74. This passageway, which is generally designated 75, also extends into the area of the relief valve 44. Further passageways are passageway 76 which interconnects annular grooves 72 and 66, a passageway 77 which interconnects annular groove 64 and passageway 76, and a passageway 78 which interconnects annular groove 67 and passageway 76. A valve chamber 79 encircles the cylindrical valve seat member 80 of the pressure relief valve 44, and is directly connected to annular groove 71. Annular groove 70 is connected by a passageway 81 into valve chamber 79, and annular groove 73 is also connected into chamber 79, but by a passageway 82.

The valve spool 61 is provided with lands 84, 85, 86 and 87 and annular grooves 88, 89 and 90. Valve spool 62 is provided with lands 91, 92, 93, and 94, and annular grooves 95, 96 and 97. The outwardly extending end portion of valve spool 61 is provided with a hole 99 for connection of any suitable manual operator to move the valve spool 61 longitudinally. The valve spool 62 is provided with a hole 100 through the extending end portion thereof for connection of a manual operator thereto for sliding the valve spool 62 in its valve bore. The valve spool 61 is shown in the center neutral position and, in this position, land 84 blocks annular groove 63 from passageway 75, annular grooves 63 and 64 are connected by annular groove 88, land 85 blocks annular groove 64 from communication with annular groove 65, annular groove 65 is connected to annular groove 66 through annular groove 89, land 86 blocks annular groove 66 from fluid communication with annular groove 67, annular groove 67 is in fluid communication with annular groove 68 through annular groove 90, and land 87 blocks annular groove 68 from any fluid communication with passageway 75. In addition to the noted neutral position, spool 61 has two other positions, one on each side of the neutral position. When the spool 61 is moved inwardly, the reverse driving position is reached, and when the spool is moved outwardly from the neutral position, the forward driving position is achieved. It may be seen that when valve spool 61 is moved inwardly to the reverse driving position, annular groove 63 is connected in free fluid communication with passageway 75, annular groove 64 is blocked from fluid communication with annular groove 63 by land 85, and land 86 will block annular groove 65 from communication with annular groove 66. When the valve spool 61 is moved outwardly, to the forward driving position, annular groove 68 is connected in fluid communication with passageway 75 by annular groove 90, land 86 blocks annular groove 67 from fluid communication with annular groove 68, and land 85 blocks annular groove 65 from fluid communication with annular groove 66.

The spool 62 has two positions, a high speed range position in which the spool is shown in FIGURE 2, and a low speed range position, which position is achieved by an inward movement of the valve spool 62. In the high speed range position shown, it may be seen that land 91 blocks annular groove 69 from communication with passageway 75, annular groove 69 is in communication with annular groove 70, land 92 blocks annular groove 70 from fluid communication with annular groove 71, annular groove 71 is in fluid communication with annular groove 72, land 93 blocks annular groove 72 from fluid communication with annular groove 73, annular groove 73 is in fluid communication with annular groove 74, and land 94 blocks annular groove 74 from fluid communication with passageway 75. When the valve spool 62 is moved inwardly to the low speed range position, the noted connections are changed as follows: annular groove 69 is in fluid communication with passageway 75, and land 92 blocks annular groove 69 from fluid communication with annular groove 70.

One end of valve spool 61 is provided with a biasing assembly 102 and one end of valve spool 62 is provided with a biasing assembly 103. The biasing assemblies 102 and 103 may be of any suitable type known in the art and serve to spring bias the spools 61 and 62 respectively to the neutral position for spool 61 and the high speed range position for spool 62.

The pressure relief valve 44 comprises, in addition to the cylindrical valve seat member 80, a valve head assembly 104, a piston assembly 105 and coiled springs 106 and 107. The cylindrical valve seat assembly 80 comprises a cylindrical section open at one end to define a valve seat, and has a rod 108 extending from the closed end thereof for insertion of the seat assembly into the valve body. A nut 109 secures the valve seat assembly 80 in the valve body. Holes 110 are formed through the cylindrical section of the valve seat assembly 80 to provide for the application of any pressure in valve chamber 79 into the cylindrical section. The valve head assembly 104 comprises a valve head 111 secured to one end of a rod, the other end of which carries a piston 112 which is slidably carried in a slightly reduced portion at the inner end of the cylindrical section of valve seat assembly 80. A vent port 83 is provided in the valve seat assembly 80 thereby subjecting the face of piston 112 to the pressure in passageway 75. One end of the compressed coil spring 106 engages the end of the valve head 111 urging it against the valve seat defined by the cylindrical section of valve seat assembly 80. The other end of the coil spring 106 engages one end of the piston assembly 105 which is slidably carried in a cylindrical casing 113. The outer end of the cylindrical casing 113 is closed and the inner end thereof is threaded through an opening in the housing 60 so that the longitudinal axis of the casing 113 is aligned on the longitudinal axis of the valve seat assembly 80. The side of the valve head 111 and the side of the piston assembly 105 engaging each end of spring 106 are in free fluid communication with passageway 75. The end of piston assembly 105 opposite from that engaging spring 106 is provided with an enlarged annular flange of a diameter substantially equal to the inner diameter of the outer end portion of the casing 113. A portion of the casing 113 intermediate the ends thereof has a diameter smaller than the diameter at the outer end portion and greater than the diameter of the portion extending through the housing 60 to define a valve chamber about the periphery of the piston assembly 105. The conduit 43 is connected through the casing 113 into this chamber so that any hydraulic fluid under pressure in conduit 43 will enter that valve chamber and will apply a force against the annular flange of the piston assembly 105 in a direction outwardly of the valve assembly. It may be seen that any such hydraulic force acts on the piston assembly 105 in the same direction as the force applied by the compressed coil spring 106. Both of these forces are opposed by the biasing force provided by the compressed coil spring 107 which is disposed within the piston assembly 105. One end of the compressed coil spring 107 engages the closed end of the casing 113 and the other end thereof engages the inner end of the piston assembly 105. The interior of the piston assembly 105 is in free fluid communication with passageway 75 by an axial passageway formed through the piston assembly 105.

In describing the operation of the pressure relief valve 44, it may be seen that if the conduit 42 from the large transmission pump 14 is connected through annular groove 69 to the passageway 75, substantially no pressure differential will exist across the annular flange of the piston assembly 105, and the force of the spring 107 will then be opposed only by the force of spring 106. The coiled springs 106 and 107 are selected to provide a net positive force by the spring 107 seating the valve head 111 with a force such that the pressure in pounds per square inch in chamber 79 times the flow of pump 15 is substantially equivalent to the maximum developed horsepower of the engine minus the pressure in pounds per square inch which may be developed by the loader pump 13 times the flow of the pump 13. The springs 106 and 107 are further selected so that when both transmission pumps 14 and 15 are driving the motor 47, fluid pressure from conduit 43 acting upon the annular flange of piston assembly 105 will reduce the net force on the valve head 111 to a force such that the pressure in pounds per square inch in valve chamber 79 times the flow of pumps 14 and 15 is equivalent to the maximum engine power which may be developed without stalling of the engine of the tractor when operating in the traveling speed range. The requirements of the springs 106 and 107 will be more clearly understood from the below described operation of the invention.

The subject invention further includes a check valve 115 which is provided in the valve body of valve 33 between passageway 75 and conduit 50. Check valve 115 will permit fluid to flow from passageway 75 into conduit 50 but will prevent any fluid flow therethrough in the opposite direction. This valve will prevent cavitation when the motor 47 may be operating faster than the pumps 14 and 15, such as in coasting.

In the operation of the present invention, it is first assumed that the loader system is in a neutral position so that no pressure is developed by the loader pump 13, and that the spool 62 of valve 33 is in the position shown in FIGURE 2, that for the high speed range, and further, that the spool 61 is in the neutral position as shown in FIGURE 2. Fluid from the loader pump 13 will freely pass through conduit 18, into port 20 of loader valve 19, out of port 25, through conduit 26, through the cooler 27, conduit 28, filter 29, and conduit 30 to conduits 40 and 41. Fluid from hydraulic pump 14 will flow through conduit 42, into annular groove 69, and from annular groove 69, through annular groove 70, passageway 81, valve chamber 79, annular groove 71, annular groove 72, passageway 76, annular groove 66, annular groove 65, passageway 75, conduit 32, conduit 31, and conduit 40 back to the pump 14. Because of a portion of the fluid from conduit 30 entering conduit 40, an identical portion will flow from conduit 32 back to the reservoir 17. Fluid from pump 15 will flow through conduit 45, annular groove 74, annular groove 73, passageway 82, valve chamber 79, annular groove 71, annular groove 72, passageway 76, annular groove 66, annular groove 65, passageway 75, conduit 32, conduit 31, and conduit 41 back to pump 15. Similarly to the flow from pump 14, some of the fluid from the pump 15 will enter the reservoir 17 through conduit 32; the quantity of fluid entering the reservoir 17 from pump 15 being equal to the remaining portion of the cooled and filtered fluid from conduit 30 entering conduit 41.

If the spool 61 is then moved outwardly to the forward driving position, the hydraulic fluid from both pumps 14 and 15 in passageway 76 will flow through passageway 77, annular groove 64, annular groove 63, conduit 49, to the motor 47. Fluid from the motor 47 will flow through conduit 50, annular groove 68, passageway 75, conduit 32, conduit 31, and through conduits 40 and 41 back to pumps 14 and 15. The tractor will then be moved forwardly in the high or travel speed range.

With the operation of the tractor in the travel speed range, the pressure developed in conduit 42 will be applied through conduit 43 to the annular flange of piston 105. This pressure will counteract a portion of the bias of spring 107 with the result that the net seating force on valve head 11 will be substantially lower than that applied by spring 107 when counteracted only by spring 106, and specifically will be a pressure which when translated into terms of power will prevent stalling of the engine of the tractor. Should the tractor encounter some obstruction or other resistance to forward travel in the high speed range so that the pressure in the hydraulic circuits from the pumps 14 and 15 to the motor 47, specifically the pressure in valve chamber 79, rises above the net seating force of spring 107, fluid in chamber 79 will flow through the openings 110 in the valve seat assembly 80, will unseat the valve head 111, and will then flow through passageway 75 and conduits 32 and 31 to the suction side of the pumps 14 and 15.

If the valve spool 61 is moved inwardly to the reverse driving position, hydraulic fluid in passageway 76 from pumps 14 and 15 will flow through passageway 78, annular groove 67, annular groove 68, and conduit 50 to the motor 47. From the motor 47, hydraulic fluid will flow through conduit 49, annular groove 63, and passageway 75, through conduits 32, 31 and 40 and 41 to the suction side of pumps 14 and 15. The tractor will then operate in the reverse direction in the high speed range. Again, the pressure relief valve will function to prevent engine stalling in the same manner as described above for the forward direction.

With the loader valve in the neutral position, with the spool 61 in the neutral position, but with the spool 62 moved to the low speed range position, hydraulic fluid from pump 14 will flow through conduit 42, annular groove 69, passageway 75, conduits 32, 31, and 40 to the suction side of pump 14. Thus, no pressure will be developed by pump 14, and consequently no hydraulic fluid pressure will be applied from conduit 43 into pressure relief valve 44. Coiled spring 107 will then seat valve head 111 with the substantially higher seating force previously described. Hydraulic fluid from the small pump 15 will flow through conduit 45, and through the valve 33 back to the suction side of pump 15 substantially as described above. If the spool 61 is then moved either to the forward or reverse positions, fluid from pump 15 flowing in passageway 76 will be directed to the motor 47 substantially as previously described to operate the tractor in either the forward or reverse directions in the low speed range.

The low speed range is selected as the working speed range for the tractor loader, in other words, that speed range in which the loader hydraulic system is operated to substantially its maximum capacity. If the loader valve 19 is operated, hydraulic fluid from pump 13 will be prevented from passing directly through the valve 19 to port 25, but will be directed to one or both of the hydraulic rams 34 and 35. The pressure relief valve 44 will now only open when the pressure in valve chamber 79 rises above that value which times the flow of pump 15 and in addition to the pressure developed by the loader pump 13 times the flow of pump 13, is substantially equivalent to the maximum available horsepower of the engine. Thus it may be seen that in the working range of the tractor loader, maximum obtainable tractive effort is provided while loading or digging with the loader mechanism of the tractor loader. The relatively small displacement of the pump 15 provides sufficient volume for movement of the tractor in the low speed range.

What is considered new and desired to be protected by Letters Patent is:

1. A hydrostatic transmission arrangement for a tractor loader including an engine, and a loader motor, a pair of pumps connected to be driven by the engine of said tractor loader, a loader pump for supplying fluid to operate said loader motor and connected to be driven by said engine said hydrostatic arrangement being connected to said pair of pumps and to drive said tractor loader, and comprising means for connecting said pair of pumps in parallel to drive said tractor loader, and means for venting one of said pair of pumps when said loader pump is supplying fluid to operate said loader motor.

2. A hydrostatic transmission arrangement for a tractor loader including an engine, and a loader motor, a pair of pumps being connected to be driven by the engine of said tractor loader, one of said pumps being of a substantially larger displacement than the other, a loader pump for supplying fluid to operate said loader motor and connectable to be driven by said engine said hydrostatic arrangement being connected to said pair of pumps and to drive said tractor loader, and comprising means for connecting said pair of pumps in parallel to drive said tractor loader, and means for venting said one of said pair of pumps when said loader pump is supplying fluid to operate said loader motor.

3. A hydrostatic transmission arrangement for a tractor loader including a traction means, a loader motor and an engine, a pair of pumps being connected to be driven by said engine, a hydrostatic motor connected to drive said traction means of said tractor loader, a loader pump for supplying fluid to operate said loader motor being connected to be driven by said engine; said transmission arrangement being connected to said pair of pumps and said hydrostatic motor and comprising valve means for connecting said pair of pumps in parallel to drive said hydrostatic motor, and means for venting one of said pair of pumps when said loader pump is supplying fluid to operate said loader motor.

4. A hydrostatic transmission arrangement for a tractor loader including a traction means, a loader motor and an engine, comprising a pair of pumps being connected to be driven by said engine, one of said pumps being of a substantially larger capacity than the other, a hydrostatic motor being connected to drive said traction means of said tractor loader, a loader pump for supplying fluid to operate said loader motor being connected to be driven by said engine; said transmission arrangement being connected to said pair of pumps and to said hydrostatic motor, and comprising means for connecting said pair of pumps in parallel to drive said hydrostatic motor, and means for venting said one of said pair of pumps when said loader pump is supplying fluid to operate said loader motor.

5. A hydrostatic transmission arrangement for a tractor loader including a traction means and an engine, a pair of pumps being connected to said engine and driven thereby, a hydrostatic motor being connected to said traction means for driving thereof; said transmission arrangement being connected to said pair of pumps and said motor, and comprising valve means selectively operable to one position for connecting said pair of pumps in parallel to drive said hydrostatic motor and to another position for connecting one of said pumps to drive said hydrostatic motor and for venting the other of said pumps, and relief valve means adjusted responsive to a certain pressure developed by said other of said pumps for substantially lowering the relief pressure thereof.

6. A hydrostatic transmission arrangement for a tractor loader including a traction means and an engine, a pair of pumps being connected to said engine and driven thereby, one of said pumps being of a substantially larger capacity than the other, a hydrostatic motor being connected to said traction means and for driving thereof; said transmission arrangement being connected to said pair of pumps and said motor, and comprising valve means selectively operable to one position for connecting said pair of pumps in parallel to drive said hydrostatic motor and to another position for connecting said other of said pumps to drive said hydrostatic motor and for venting said one of said pumps.

7. A hydrostatic transmission arrangement for a tractor loader including a traction means and an engine, a pair of pumps being connected to said engine to be driven thereby, one of said pair of pumps being of a substantially larger capacity than the other, a hydrostatic motor being connected to said traction means and for driving thereof; said transmission being connected to said pair of pumps and to said motor, and comprising valve means selectively operable to one position for connecting said pair of pumps in parallel to drive said hydrostatic motor and to another position for connecting said other of said pumps to drive said hydrostatic motor and for venting said one of said pumps, and relief valve means adjusted responsive to a certain pressure developed by said one of said pumps for substantially lowering the relief pressure thereof.

8. A hydrostatic transmission arrangement for a tractor loader including an engine a hydraulically operated loader motor and a traction means; said loader motor being connected to selectively use a certain portion of the maximum available power of said engine comprising, a pair of pumps being connected to said engine to be driven thereby, a hydrostatic motor being connected to said traction means for driving thereof; said transmission arrangement being connected to said pair of pumps and said hydrostatic motor, and comprising valve means selectively operable to one position for connecting said pair of pumps in parallel to drive said hydrostatic motor and to another position for connecting one of said pumps to drive said motor and for ventitng the other of said pumps, and relief valve means operating responsive to the driving of said hydrostatic motor by said one of said pumps for permitting substantially the remaining portion of the maximum available power of said engine not used by said loader motor to drive said one of said pumps and said last mentioned means further operating responsive to the driving of said hydrostatic motor by said pair of pumps in parallel to permit substantially the full engine power to drive said pair of pumps.

9. In a tractor loader including an engine, a traction means and a loader motor, a loader pump connectable to be driven by said engine of said tractor, hydraulic pump means connectable to be driven by said engine, a hydrostatic transmission arrangement including a motor connected to said traction means for driving thereof, hydraulic fluid conduit means connecting said hydraulic pump means and said hydrostatic arrangement in series, hydraulic fluid filtering and cooling means, and second hydraulic fluid conduit means connecting said loader pump, said loader motor and said hydraulic fluid filtering and cooling means in series, a portion of said first and second hydraulic fluid conduit means being common so that a portion of any hydraulic fluid flowing through said first hydraulic fluid conduit means is filtered and cooled.

10. In a tractor loader including an engine, a traction means and a loader motor, a loader pump connected to be continuously driven by said engine of said tractor, hydraulic pump means connected to be continuously driven by said engine, a hydrostatic means connected to said traction means for selectively driving thereof, hydraulic conduit means connecting said hydraulic pump means and said hydrostatic means in series, a hydraulic fluid reservoir, hydraulic fluid filtering and cooling means, and second hydraulic fluid conduit means connecting said loader pump, said loader motor, said reservoir, said hydraulic fluid filtering and cooling means and a portion of said first hydraulic fluid conduit means in series so that a portion of any hydraulic fluid flowing through said first hydraulic fluid conduit means, said hydrostatic means and said hydraulic pump means is filtered and cooled.

11. A hydrostatic transmission arrangement for a tractor including a traction means and an engine, a pair of pumps being connected to said engine to be driven thereby, a hydrostatic motor being connected to said traction means for driving thereof; said transmission arrangement being connected to said motor and said pair of pumps, and comprising valve means selectively operable to one position for connecting said pair of pumps in parallel to drive said hydrostatic motor and to another position for connecting one of said pumps to drive said hydrostatic motor and for venting the other of said pumps, and relief valve means operating responsive to the driving of said hydrostatic motor by said pair of pumps in parallel to develop a certain motor torque for preventing the stalling of said engine when said pair of pumps are absorbing substantially the full output torque of said engine and said last mentioned means operating responsive to the driving of said hydrostatic motor by said one of said pumps for permitting said one of said pumps to absorb substantially less of the full output torque of said engine while developing a motor torque greater than said certain motor torque.

12. A hydrostatic transmission arrangement for a tractor loader including a hydraulically operated loader traction means and an engine, said loader being connected to said engine to selectively use a certain portion of the available power of said engine comprising, a pair of pumps connectable to be driven by said engine of said tractor loader, a hydrostatic motor being connected to said traction means for driving thereof; said hydrostatic arrangement being connected to said pair of pumps and said motor, and comprising valve means selectively operable to one position for connecting said pair of pumps in parallel to drive said hydrostatic motor and to another position for connecting one of said pumps to drive said motor and for venting the other of said pumps, and relief valve means operating responsive to the driving of said hydrostatic motor by said pair of pumps in parallel for preventing the stalling of said engine when said pair of pumps are receiving substantially the full power of said engine, and said last mentioned means operating responsive to the driving of said hydrostatic motor by said one of said pumps for permitting said one of said pumps and said hydraulically operated loader to receive substantially the full power of said engine.

13. A hydrostatic transmission arrangement for a tractor loader including a hydraulically operated loader an engine and a traction means, said loader being connected to said engine to selectively use a certain portion of the available power of said engine, a pair of pumps connectable to be driven by the engine of said tractor, one of said pair of pumps being of a substantially larger capacity than the other, a hydrostatic motor being connected to said traction means for driving thereof; said transmission arrangement being connected to said motor and said pair of pumps, and comprising valve means selectively operable to one position for connecting said pair of pumps in parallel to drive said hydrostatic motor and to another position for connecting said other of said pumps to drive said motor and for venting said one of said pumps, and relief valve means operating responsive to the driving of said hydrostatic motor by said pair of pumps in parallel for preventing the stalling of said engine when said pair of pumps are receiving substantially the full power of said engine, and said last mentioned means operating responsive to the driving of said hydrostatic motor by said other of said pumps for permitting said other of said pumps and said hydraulically operated loader to receive substantially the full power of said engine.

14. In a tractor loader including an engine, a traction means and a loader motor, a loader pump being connected to said loader motor and to said engine to be driven thereby, a pair of pumps being connected to said engine to be driven thereby, a hydrostatic transmission means being connected to said pair of pumps and to said traction means for driving thereof, said transmission means including means for connecting said pair of pumps in parallel for driving said traction means, and means in said transmisison means for venting one of said pair of pumps when said loader pump is supplying fluid to operate said loader motor.

15. In a tractor loader including an engine, a traction means and a loader motor, a loader pump being connected to said engine to be driven thereby and being connected to said loader motor, a pair of pumps being connected to said engine to be driven thereby, a hydrostatic transmission means including a traction motor being connected to said traction means and to said pair of pumps, said traction motor for driving said traction means, said transmission means providing valve means selectively operable to one position for connecting said pair of pumps in parallel to said traction motor and to another position for connecting one of said pumps to drive said traction motor and for venting the other of said pumps, relief valve means in said hydrostatic means operating responsive to the driving of said traction motor by said one of said pumps for permitting substantially the remaining portion of the maximum available power of said engine not used by said loader motor to drive said one of said pumps, and said relief means further operating responsive to the driving of said traction motor by said pair of pumps in parallel to permit substantially the full engine power to drive said pair of pumps.

16. In a tractor loader including an engine, a hydraulically operated loader motor and a traction means, a loader pump being connected to said engine and said loader motor to selectively use a certain portion of the available power of said engine, a pair of pumps connectable to said engine to be driven thereby a hydrostatic transmission means including a traction motor being connected to said traction means and to said pair of pumps, said traction motor for driving said traction means, said transmission means providing valve means selectively operable to one position for connecting said pair of pumps in parallel to drive said traction motor and to another position for connecting one of said pair of pumps to drive said traction motor and for venting the other of said pair of pumps, and said transmission means further providing relief valve means operating responsive to the driving of said traction motor by said pair of pumps in parallel for preventing the stalling of said engine when said pair of pumps are receiving substantially the full power of said engine, and said relief valve means further operating responsive to the driving of said traction motor by said one of said pumps for permitting said one of said pumps and said loader pump during operation of said loader motor to receive substantially the full power of said engine.

References Cited in the file of this patent

UNITED STATES PATENTS

| | | |
|---|---|---|
| 2,789,648 | Huffman | Apr. 23, 1957 |
| 2,833,116 | Rush | May 6, 1958 |
| 2,879,612 | Schultz et al. | Mar. 31, 1959 |
| 2,959,923 | Shook | Nov. 15, 1960 |
| 3,005,562 | Shaffer | Oct. 24, 1961 |